United States Patent [19]

Ralston et al.

[11] Patent Number: 4,716,723
[45] Date of Patent: Jan. 5, 1988

[54] FUEL CONTROLS FOR GAS TURBINE ENGINES

[75] Inventors: Russell B. Ralston, Loves Park; Daniel J. McLevige, Davis, both of Ill.

[73] Assignee: Woodward Governor Company, Rockford, Ill.

[21] Appl. No.: 904,720

[22] Filed: Sep. 5, 1986

[51] Int. Cl.⁴ ............................................. F02C 9/28
[52] U.S. Cl. ..................................................... 60/39.281
[58] Field of Search ..................................... 60/39.281

[56] References Cited

U.S. PATENT DOCUMENTS

| | | | |
|---|---|---|---|
| 2,478,752 | 8/1949 | Drake | 121/42 |
| 2,478,753 | 8/1949 | Parker | 121/42 |
| 2,765,800 | 9/1956 | Drake | 137/26 |
| 2,986,126 | 5/1961 | Werts | 60/39.281 |
| 3,050,941 | 8/1962 | Rogers | 60/39.281 |
| 3,808,801 | 5/1974 | Taylor | 60/39.281 |

OTHER PUBLICATIONS

Woodward Governor Company Sales Orders G84076 and G90085 respectively dated Jul. 7, 1984 and Dec. 14, 1984.
Woodward Governor Company Drawing No. X-54-9-01 dated 9/9/44.
Woodward "CFM56 MEC Schematic" dated Nov. 1, 1983.
"Legend for CFM56 MEC Schematic", dated Nov. 1, 1983.
Woodward Governor Company, Component Maintenance Manual, 8062-Series Main Engine Control, dated Nov. 15, 1983.

Primary Examiner—Louis J. Casaregola
Attorney, Agent, or Firm—Leydig, Voit & Mayer

[57] ABSTRACT

Apparatus for controlling the flow rate of fuel fed to a gas turbine engine, particularly but not exclusively to prevent overspeeding of the engine above a maximum safe level in the event of failure of a primary control system and associated components. A first control valve V3 is associated with means for sensing pressure drop ΔP across a series metering valve V1 and arranged to control the opening or closing of a bypass valve V2 to keep ΔP essentially constant and equal to a set point. A second control valve V4 is associated with a speed-sensing governor and arranged to control the opening or closing of that same bypass valve V2, so that engine fuel rate is controlled to maintain speed at an overspeed set point if abnormal conditions or failures tend to cause overspeeding. When the overspeed governor valve begins to be active as speed exceeds a first threshold and moves toward the overspeed set point, the governor valve V4 disables the first control valve to prevent the latter's action from closing the bypass valve and thus tending to increase engine fuel rate.

5 Claims, 1 Drawing Figure

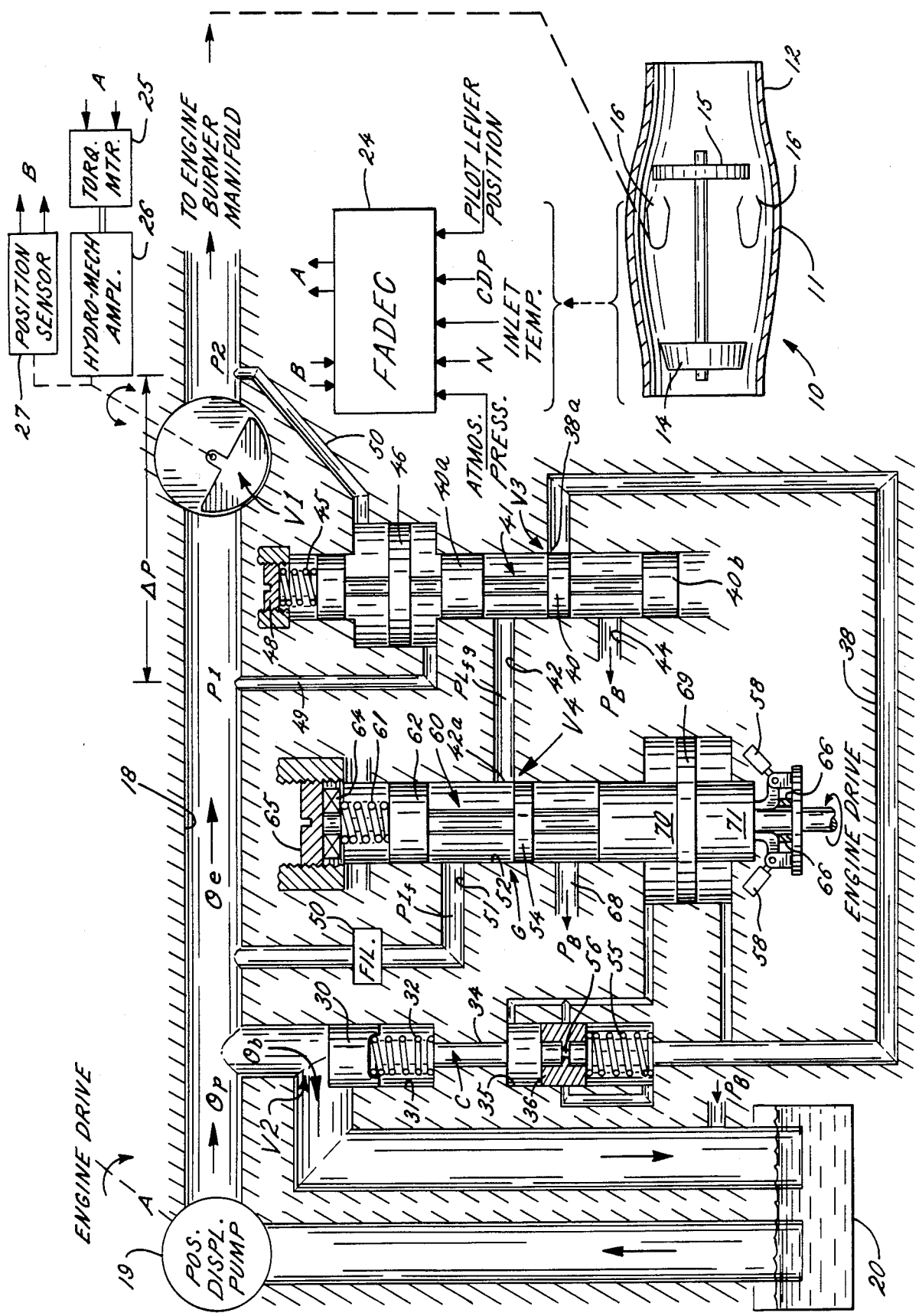

FUEL CONTROLS FOR GAS TURBINE ENGINES

The present invention relates in general to the control of gas turbine engines and, in particular, to the control of fuel feed to such engines for governing or limiting rotational speed. Although not so limited in its various applications, the invention will find particular advantage with what are commonly called electrical or electronic control systems for gas turbine engines.

OBJECTS AND ADVANTAGES OF THE INVENTION

A primary aim of the invention is to provide overspeed safeguarding in the control of gas turbine engines in a fashion which acts successfully in response to failure or malfunction of essentially any component of a primary control system, including particularly failure of either a main fuel metering valve or a constant pressure drop control valve conventionally associated with the metering valve.

A coordinate objective is to provide an overspeed governor in a fuel control system for gas turbine engines, wherein the governor is in series with a constant pressure drop control—with the result that the maintenance of constant pressure drop across a main metering valve is disabled when governing action begins, and speed is isochronously controlled at the overspeed set point.

Another object of the invention is to provide a gas engine fuel control system in which constant pressure drop across a main metering valve is normally maintained by a $\Delta P$ control valve which acts upon a variable fuel bypass valve, but in which an overspeed governor is coupled to the same bypass valve via the $\Delta P$ control valve—such that overspeeding is prevented by governing action even if the $\Delta P$ control valve sticks or fails in a fashion that tends to make the main valve pressure drop excessive.

And it is also an object of the invention to provide such overspeed protection without shutting down the engine or drastically reducing power, but on the contrary by keeping the engine speed isochronously governed at the overspeed set point so long as the conditions tending to cause overspeeding continue to exist. This enables the pilot of an aircraft powered by the engine more readily to keep control of the aircraft without emergency glide or disturbing power surges.

BRIEF DESCRIPTION OF DRAWING

These and other advantages will become apparent as the following description proceeds in conjunction with the accompanying drawing, in which the single figure is a diagrammatic illustration of an aircraft gas turbine engine with an associated control system which forms a preferred example of various possible embodiments of the invention.

While the invention has been illustrated and will be described in some detail with reference to a preferred embodiment, there is no intention thereby to limit the invention to such detail. On the contrary, it is intended here to cover all modifications, alternatives and equivalents which fall within the spirit and scope of the appended claims.

DETAILED DESCRIPTION OF THE PREFERRED EMBODIMENT

To explain the background environment in which the invention resides, the drawing in simplified fashion illustrates an aircraft gas turbine engine and a primary fuel control which normally determines and establishes the rate at which fuel is supplied to the engine. That is, an engine 10 is shown as including a housing 11 with its conventional tailpipe 12 and containing a journaled rotor shaft carrying a compressor 14 and a driving turbine 15. The turbine is disposed downstream of a plurality of circularly spaced burners 16 (or annular combustion chamber) which are fed with fuel via nozzles connected to a manifold ring (not shown). Those skilled in the art will, without more, understand the organization of the engine, the details of which are not critical to the practice of the invention. The engine may, of course, be of the so-called "fan" type and it may have two or more rotors with a so-called "core".

Fuel is fed to the burner manifold via a main conduit 18 on the output side of a positive displacement pump 19 driven from the engine 10 and having its input leading via a boost pump (not shown) from a source 20 of liquid fuel, i.e., from a fuel tank. The rate of fuel flow $Q_p$ from the pump 19 is proportional to engine speed. The pressure P1 at the output side of that pump is determined by the "hydraulic impedance" created by two parallel flow paths. The first flow path for fuel fed to the engine at a rate $Q_e$ (expressible as pounds per hour or gallons per minute) proceeds along the main conduit 18, through a main metering valve V1 and thence to the burner manifold and burners 16. The second flow path shunts liquid fuel at a flow rate $Q_b$ from the pump output (i.e., from the main conduit) via the variable opening of a bypass valve V2 back to a low pressure sump, here shown as the fuel tank or source 20. It is self-apparent that the pump flow rate $Q_p$ is equal to the sum of the flow rate $Q_e$ to the engine and the bypass flow rate $Q_b$. As engine speed N (expressible in units of r.p.m.) increases, one sees that the bypass valve must open wider if the opening of the metering valve V1 remains the same and if engine fuel rate $Q_e$ is to be kept unchanged.

On the other hand, if the metering valve V1 (in series with the burner nozzles) is opened or closed, the engine fuel rate $Q_e$ will increase or decrease. Thus, engine fuel rate, engine speed, and engine thrust power are determined by a primary control system which acts to adjust the series metering valve V1 as a final controlled element.

Although the primary control system may take any one of various known configurations to act on the series metering valve V1, the drawing illustrates, by way of example, a "full authority digital electronic control" (FADEC) 24 familiar to those skilled in the art. This includes one or more programmed digital computers associated with analog-to-digital converters (ADC's) and digital-to-analog converters (DAC's) so that the values of several sensed engine parameters are dynamically treated according to a pre-established algorithm to arrive at a dynamically changed output signal A representing the commanded position (opening) of the metering valve V1. That commanded position is, in effect, tantamount to a commanded engine input fuel rate $Q_e$ for reasons made clear below.

Merely as typical, the FADEC 24 is here shown as receiving input signals representing various parameters, e.g., atmospheric pressure, engine speed N, engine inlet air temperature, compressor discharge pressure (CDP), and power (pilot's) lever position. These are used in "computing" the command signal A to establish and vary the engine fuel supply rate $Q_e$ which is required or safe in various combinations of conditions (air temperature, aircraft speed, altitude, CDP, engine speed—to name examples) with appropriate "scheduling" of acceleration and deceleration limits which avoid excessive burner temperatures, compressor stall, or flame-out. The command signal A is fed to a torque motor 25 to adjust the position of a spring-biased control member serving as the input to a hydromechanical amplifier 26 which rotates the valve V1 to a position agreeing with the A signal value. Agreement is assured by closed loop feedback from a position sensor 27—so that corrective action is continued until the effective value of the signal A equals that of the signal B.

According to common practice, the FADEC is organized and programmed on the premise that engine fuel flow rate $Q_e$ is a known monotonic function of the metering valve position. To make that premise valid, the valve V1 is constructed such that it behaves according to the well known hydraulic relationship:

$$Q_e = k \cdot A_1 \cdot \sqrt{\Delta P} \qquad (1)$$

where $Q_e$ is the rate of flow through the valve, $A_1$ is the area of the valve opening, $\Delta P$ is the differential pressure or pressure drop across the valve, and k is simply a factor of proportionality. Obviously, $$\Delta P = P1 - P2 \qquad (2)$$

Thus, when flow rate through the valve increases, $\Delta P$ will increase if area $A_1$ stays the same, and vice versa. Stated differently, if $\Delta P$ is held constant, then one knows that flow rate $Q_e$ may be accurately increased or decreased—and established at a desired value—by adjusting the valve position to make the area $A_1$ have a proportionally corresponding value.

To achieve an essentially constant pressure drop $\Delta P$, a closed loop arrangement is associated with the bypass valve V2. As here shown, a $\Delta P$ control valve V3 is made responsive to means for sensing the actual, existing value of the pressure drop $\Delta P$,—and that valve V3 is hydraulically coupled to control the bypass valve V2 such that, under normal conditions, the value of $\Delta P$ is maintained essentially constant and equal to a predetermined desired value (the $\Delta P$ "set point") $\Delta P_d$.

For an understanding of how this constant $\Delta P$ is achieved, it may be noted first that the bypass valve V2 in the present embodiment is associated with and in part formed by a piston actuator. That is, the valve V2 includes a piston 30 vertically slidable in a cylinder 31, and with the upper portion of that piston disposed to reduce or increase the variable, effective area of a valve passage through which the bypass flow $Q_b$ passes. A compression spring 32 creates an upward preload force on the piston 30 partially to remove the effect of the downward force arising from the pressure P1 acting on the upper surface area of that piston. In net effect, however, the vertical position of the piston 30 (and thus the opening or area of the valve V2) is determined by the volume of liquid fuel which is present in a "chamber" behind that piston. The "chamber" C is here collectively formed by the cylinder 31, a conduit 34, a cylinder 35 in which a buffer piston 36 resides, and a conduit 38 leading back to the valve V3.

Conduit 38 may be viewed as coupled to a controlled port or output line 38a of the valve V3. The latter is constituted by a land 40 formed on a valve rod 41 vertically movable in a stationary housing (and rotationally driven, if desired, to eliminate stiction), there being a pressure input line 42 above the land 40 and a return line 44 below the land 40. The return line leads to a low pressure $P_B$ at a sump, here shown as returning to the source or fuel tank 20. Sealing lands 40a and 40b are spaced above and below the valve land 40. The vertical position of the rod 41—and thus of the valve land relative to the port 38a—is determined by the balance of forces exerted (i) in a downward direction by a compression spring 45, (ii) in an upward direction due to pressure acting on the underside of an actuator piston 46, and (iii) in a downward direction by pressure acting on the upper surface of the piston 46. The set point value $\Delta P_d$ is established by vertical adjustment of a stop screw 48 against which the spring 45 bears.

The actuator piston 46 constitutes a means for sensing the differential pressure drop $\Delta P$ across the metering valve V1. As shown, hydraulic lines 49 and 50 lead from the upstream and downstream sides of that valve to the lower and upper portions of the housing cylinder in which the actuator piston is disposed. Thus, the upward and downward forces on the lowermost and uppermost equal surface areas of the piston 46 are proportional to the respective pressures P1 and P2. The net upward force is proportional to P1-P2 and thus to the pressure drop $\Delta P$. The position of the rod 41 will change (moving the land 40 relative to its port 38a) until the spring 45 is sufficiently relaxed or compressed to balance the net upward force on the piston 46. When the actual $\Delta P$ is equal to the set point $\Delta P_d$ established by adjustment of the stop screw 48, the valve land 40 will be centered on the port 38a—thus connecting neither the pressure line 42 nor the sump return line 44 to the output line 38a and the chamber C associated with the bypass piston 30.

In normal modes of operation, a source of high pressure fluid is coupled to the pressure input line 42. In accordance with the present invention, and for reasons to be described below, this coupling is established through a normally open overspeed governor valve V4. The overspeed governor will be treated later; for the present, it is sufficient to note that, in this example, fuel at the relatively high pressure P1 in the main conduit 18 is coupled via a filter 50 and a supply line 51 to a cylinder 52 in which a land 54 (forming the valve V4) is disposed. As shown, that land is normally beneath its associated output port and conduit 42a so the valve V4 normally makes the pressure $P1_{fg}$ equal to $P1_f$—the latter being the pressure on the output side of the filter and essentially equal to P1. In summary, in normal modes of operation, fluid at high pressure is supplied to the input line 42 of the $\Delta P$ valve V3 via a normally open valve V4 associated with an overspeed governor.

The operation by which $\Delta P$ is normally held constant may now be understood. If in steady state conditions the valve land 40 is centered (as shown) on its output port 38a, then fluid is for all intents and purposes trapped in the "chamber" 38, 35, 34, 31. The bypass piston 30 is stationary at a position which makes the opening of the valve V2 produce bypass flow at a rate $Q_b$ which causes the flow $Q_e$ to produce a pressure drop $\Delta P$ which is equal to the set point $\Delta P_d$. If now the FADEC 24 should cause the metering valve V1 to open or close, thereby increasing or decreasing the area $A_1$ appearing in Eq. (1) above, the actual value of $\Delta P$ will tend to decrease or increase.

In the first case, $\Delta P$ becomes less than $\Delta P_d$ and the spring 45 will shift the valve land 40 downwardly— so that the pressure P1f forces fluid to flow via conduit 51, the open valve V4, conduit 42, and into the output line 38a, 38. As such fluid enters the bypass chamber C, it shifts the buffer piston 36 upwardly against the tension of a bi-directional spring 55, and in part passes through an orifice 56, so that the piston 30 moves upwardly (and essentially as if the buffer piston were not present) to progressively close the bypass valve V2. This in turn reduces the bypass valve flow $Q_b$ and increases the engine flow $Q_e$ until the pressure drop $\Delta P$ rises again to the set point value and the valve land 40 is restored to its illustrated neutral position—whereupon the admittance of fluid into the "chamber" ceases. The rate of fluid admittance into the "chamber" will be generally proportional to the opening of the valve V3, which is in turn proportional to the difference or error between $\Delta P$ and $\Delta P_d$. The piston 30 moves upwardly at a velocity proportional to the V3 opening which connects the lines 42 and 38 and thus the position of the piston changes as a time integral function of the $\Delta P$ error.

In the second case, when the metering valve V1 is for any reason closed somewhat, the actual drop $\Delta P$ will increase. The valve rod 41 will therefore move up to lift the land 40 above the illustrated neutral position, thereby establishing a flow path from the chamber C via the conduit 38, the port 38a and the return line 44 to the sump 20. The pressure P1 at the top of piston 30 keeps the fluid in the chamber C pressurized, although a value somewhat less than P1 due to the upward force of the spring 32. The presence of that pressure causes venting action, i.e., flow of fluid through the conduit 38, the port 38a, and the return line 44 to the low pressure $P_b$ at the sump. As fluid is vented, the piston 30 moves down (again at a rate proportional to the amount by which the valve V3 is open to the line 44) to progressively open the bypass valve V2. This increases the flow $Q_b$, decreases the flow $Q_e$, and causes the pressure drop $\Delta P$ to fall until it is restored to the set point value $\Delta P_d$—and the land 40 is restored to neutral.

It may be seen, therefore, that closed loop action keeps the pressure drop $\Delta P$ essentially constant and equal to the desired value $\Delta P_d$ (which is selected by setting the screw 48) when for any reason a difference arises between the two. If the FADEC 24 moves the valve V1 in a closing direction, or if the engine speed increases to increase the pumped flow $Q_p$, the bypass valve V2 shifts to become more widely open until $\Delta P$ is restored to the set point. If the FADEC 24 moves the valve V1 in an opening direction, or if the engine speed decreases to decrease the pumped flow $Q_p$, the bypass valve V2 shifts in a closing direction. Because $\Delta P$ is thus kept essentially constant at a known value, the flow $Q_e$ is directly proportional to the area $A_1$, and thus related by a known function to the position of the valve V1.

In the operation of a gas turbine engine, it is imperative that speed never be permitted to exceed some designated safe value $N_{os}$ which is specified by the engine designer. Among other considerations, centrifugal forces on compressor or turbine components may cause them to literally fly apart at an excessive speed, or lubrication and bearing failures may be experienced. Normally the primary control system will not let the main metering valve V1 pass fuel to the engine at a rate $Q_e$ which lets the speed N exceed a maximum speed $N_m$ which is the highest value which the FADEC 24 may schedule or permit when there is no failure or malfunction. The sensed speed signal N fed to the FADEC 24 is processed by the latter so it causes the main valve V1 to move in a closing direction if engine speed attempts to exceed the value $N_m$. But when the engine is accelerated during a "throttle burst", the fuel flow rate $Q_e$ may indeed be greater than that which ultimately (if the valve V1 were not reclosed) would run the engine speed up above the top speed $N_m$, and indeed above the safe overspeed value $N_{os}$. Or, when the engine is operating at a given speed at low altitude with a given setting of the valve V1, as altitude is increased, engine speed may well exceed that safe value if the valve V1 is not closed somewhat, and the primary control must then move the valve V1 in a closing direction.

Wholly unexpected, unintended and low-odds failures may occur in the primary control system, however, for various reasons. For example, the sensor which supplies the signal N to the FADEC 24 might malfunction to produce a signal saying that engine speed is lower than it actually is; the FADEC may then in blithe ignorance call for the metering valve V1 to open so wide that the engine overspeeds beyond the value $N_{os}$. It has been a common practice, therefore, to provide an overspeed governor separate from the primary control system to take over and limit fuel flow if an overspeed "trip point" is reached. In such arrangements, however, that overspeed governor acts with an overriding effect on the main metering valve; the overspeed governor is helpless if the metering valve itself sticks or fails when opened to a position, for example, during acceleration or at low altitude, which under different conditions will cause the overspeed ceiling to be exceeded. In another type of overspeed protection mechanism (exemplified by the Woodward Governor Company product X83556, which is a fuel control for the General Electric CFM 56 type of gas turbine engine), tachometer speed sensing flyweights are provided to furnish speed-representing rotational input to a three-dimensional cam which participates in acceleration/deceleration scheduling of fuel input rate to the engine by the action of a series metering valve; as the rotational input reaches a magnitude corresponding to an overspeed trip point, a camming arm affirmatively displaces a $\Delta P$ control valve which then vents fluid behind a bypass valve piston. In this prior mechanism, overspeeding is prevented by opening of the bypass valve, and despite failure of the series metering valve, but such prevention (a) does not govern with stability at the overspeed trip value, (b) requires participation of the $\Delta P$ control valve, and (c) cannot be obtained if the $\Delta P$ control valve sticks or fails in a position which keeps fluid pressure behind the bypass valve piston. Thus, prior overspeed limiting arrangements have provided the desired insurance factor against certain types of unexpected malfunctions, but they have not provided protection against failure of either or both the main metering valve and a constant $\Delta P$ control valve.

In accordance with the present invention, a governor is arranged to act not upon the main metering valve but rather upon the bypass valve to control and hold engine speed at a maximum reference value $N_{os}$ if and when for any reason the engine speed tends to rise above that safe value. The governor acts upon the bypass valve through the $\Delta P$ control valve in a fashion such that failure of either the metering valve or the ΔP control valve will preclude overspeeding.

In the embodiment here illustrated, the overspeed governor G comprises speed sensing means independent of that which supplies the signal N to the FADEC 24, and specifically a set of flyweights 58 driven from the engine and acting to transform centrifugal force into an upward force on a rotating governor rod 60. That rod is vertically slidable in an hydraulic casing and may shift the valve land 54 relative to the port or output line 42a of the governor valve V4. When the governor is active, the position of the rod 60 (and the opening of the port 42a) is determined by balancing the vertically upward force of the flyweights 58 and the vertically downward force of a compression spring 61 disposed between an upper rod land 62 and a bearing 64 whose vertical position is adjustable by a stop screw 65. Adjustment of the screw 65 determines the speed "set point" $N_{os}$ of the governor. The set point value $N_{os}$ is that value of engine speed which results in the valve land 54 being centered relative to the output port 42a.

Because the governor G here illustrated is an overspeed governor for back-up safety, the spring 61 and screw 65 are chosen and adjusted such that they normally predominate over the flyweight force to hold the rod 60 down at a position determined by suitable mechanical stop means. Stops 66 below the flyweight fingers establish the lower limit position of the rod 60, and determine the "normal" position of the land 54 which, as shown, makes the valve V4 normally open to provide an unimpeded connection between the conduits 51 and 42. In this position, the land 54 and valve V4 close off a connection between the controlled port 42a and a return line 68 which leads back to the sump 20, here assumed to reside at a low pressure $P_B$. Assuming merely for purposes of discussion that maximum engine speed $N_m$ is 7000 r.p.m. and that engine specifications designate that an overspeed value of 7500 r.p.m. is not to be exceeded, then the spring 61 is adjusted to make the valve land 54 rise to a "neutral" position (just covering the port 42a) at what may be called the overspeed set point $N_{os}$ equal to about 7420 r.p.m. With that as a reference set point, the valve rod will be held down with the flyweight arms against the stops 66 so long as engine speed is below or at 7000 r.p.m. As speed progressively rises above 7000 r.p.m., the valve land 54 will progressively close off the connection between conduits 51, 42—with maximum impedance to flow occuring at 7420 r.p.m. As speed increases still further, a progressively wider valve connection is created between the conduits 42 and 68—so that fluid may be returned to the sump 20 from the conduit 42.

The governor rod 60 is formed to include a pressure sensing piston 69 riding in a cylinder and bounded by sealing lands 70, 71. This piston responds to any pressure drop across the orifice 56 in the buffer piston to create a compensating force (supplementing the upward force of the flyweights 58 and the downward force of the spring 61), thereby making the governor stable and isochronous when conditions tending to cause overspeeding continue to exist. The compensating action—of a spring-centered buffer piston, associated with an orifice, to provide "temporary droop" feedback to a governor valve rod—is described in the prior art, for example, U.S. Pat. Nos. 2,478,752 and 2,478,753 and 2,765,800. Without repeating that description in full, it may be noted here that when fluid is admitted to or vented from the conduit 38 at a high rate, it cannot pass through the small orifice 56 at that rate. The buffer piston 36 is thus displaced from the centered position established by the spring 55, making the pressure different on opposite sides of that piston. Then as flow through the conduit 38 falls off toward zero, the spring 55 forces the piston 36 back to its centered position, with the slow rate of return established by flow through the orifice 56. So long as there is flow through that orifice, and thus a differential pressure drop across it, there is a difference in pressures applied to upper and lower surfaces of the sensing piston 69—thereby creating a force which may be viewed as algebraically adding to or subtracting from the force of the spring 61. This compensating force gradually and smoothly returns to zero, however, as the buffer piston returns to its centered position.

To consider the action of the governor G, assume first that the valve rod 41 has been shifted downwardly from the illustrated neutral position so that the valve V3 essentially fully connects conduit 42 to port 38a and conduit 38. When actual engine speed N is equal to the overspeed set point $N_{os}$ and valve land 54 is centered on its port 42a, then for all intents and purposes fluid is neither fed to nor vented from the "chamber" 42, 38, 35, 34, 32—and the bypass piston will remain in a steady-state position which holds engine speed at the overspeed set point $N_{os}$. If engine speed rises above that value, the valve land 54 rises to make the valve V4 connect the conduit 42 to the sump return line 68—so that fluid is vented by flow through the open ΔP control valve V3 from the "chamber", the piston 30 falls to move the valve V2 in an opening sense, the flow $Q_b$ increases, the flow $Q_e$ decreases (for any given, then-existing setting of the main valve V1), and the engine speed is correctively reduced back down to the set point $N_{os}$.

On the other hand, if the engine has been operating at the overspeed set point $N_{os}$, and if engine speed begins to fall, the valve land 54 will move downwardly to progressively connect the conduit 51 to the conduit 42—and now fluid is admitted via 51, 42, the open port 42a, and the open ΔP valve V3 to the "chamber" C. The piston 30 will therefore rise to move valve V2 in a closing sense, the flow rate $Q_b$ will fall, the flow rate $Q_e$ will rise, and engine speed will tend to increase back up to the overspeed set point $N_{os}$. Any speed greater than maximum speed $N_m$ is abnormal, however, and thus it is not important that the overspeed governor bring engine speed back up to the overspeed set point. Indeed, it is preferable if the conditions which initially tended to cause overspeeding cure themselves, that the speed then continue downwardly to that value called for by the FADEC 24.

The cooperative interaction of the constant ΔP valve V3 and the governor valve V4 may now be explained. From what has been said above, one sees that the governor valve V4 is a three-way valve in series with the pressure feed or input line 42 of the three-way valve V3. Valve V4 has high pressure (input) and low pressure (return) lines 51 and 68 selectively and alternatively coupled to its output line 42 according to the position of the valve land 54. Valve V3 has high pressure (input) and low pressure (return) lines 42 and 44 selectively coupled to its output line 38 (and the "chamber" C) according to the position of its valve land 40. When the valve land 54 is down and open, then valve V3 controls the positioning of the bypass valve piston 30 to keep the main valve pressure drop ΔP essentially equal to the set point $\Delta P_d$. When the valve land V3 is down and open, the valve V4 controls the positioning of the bypass valve piston 30 to adjust the flow rate $Q_e$ in a manner such that engine speed is held at or below the set point $N_{os}$.

When everything is "normal", speed N will be at or below rated maximum speed $N_m$ and the flyweight arms will bear against the stops 66 to locate the valve land 54 down and open (as the drawing shows). The valve land 40 will be essentially centered. If now some malfunction occurs (e.g., if the engine has been accelerating, the valve V1 has been very widely opened, and that valve linkage breaks or sticks) which causes engine speed to continue increasing above $N_m$ (e.g., 7000 r.p.m.), then the flyweights 58 will progressively raise the valve land 54 to progressively close the port 42a and create what amounts to a decreasing orifice or an increasing impedance to fluid flow. The valve V3 is not "ideal"; even when land 40 is centered, some fluid leaks from the high pressure $P1_{fg}$ in conduit 42 to the lower pressure in conduit 38, and some fluid leaks from the higher pressure in conduit 38 to the lower pressure ($P_b$) beneath the land 40 and in conduit 44. Normally, these leakages balance and the net flow into or from the conduit 38 is zero when the land 40 is centered. Thus, as the port 42a progressively closes when speed rises above $N_m$, a pressure drop develops across the valve port 54/42a and the pressure $P1_{fg}$ falls relative to the pressure $P1_f$. Leakage rate from 42 into 38 is thus reduced as valve land 54 closes, but leakage rate from 38 into 44 remains the same. The net leakage is thus from the conduit 38 and the chamber C, so that the bypass valve V2 begins to open as speed begins to rise from $N_m$ and valve V4 begins to close. Such opening of the bypass valve increases the flow rate $Q_b$ and reduces the flow rate $Q_e$—the effect of the latter being to (i) reduce the drop $\Delta P$ and (ii) reduce the rate of rise of engine speed. Engine speed may continue to increase, despite this "anticipation" effect; as it does so the valve V4 closes more in an upward sense, the pressure $P1_{fg}$ falls more, the leakage imbalance increases, and net flow from the "chamber" increases to open valve V2 more, and further reduce both $\Delta P$ and $Q_e$.

As the overspeed set point $N_{os}$ is approached, therefore, the "constant $\Delta P$" control valve V3 is disabled because $\Delta P$ is forced to fall by the progressive closure of the governor valve V4. As $\Delta P$ falls below $\Delta P_d$, the sensing piston 46 permits the spring 45 to shift the valve land 40 to a somewhat "opened down" position—but no pressure fluid is in consequence forced into the "chamber" C because the valve V4 is essentialy closed and presents a large hydraulic impedance to flow from the conduit 51.

If the conditions causing the increase in speed continue to exist, the valve V4 will rise to its centered position and essentially all flow into the "chamber" will cease, even with the valve V3 disabled, i.e., opened down from its neutral position. The pressure in the "chamber" will be essentially equal to $P1_{fg}$. Indeed, the conduit 42 will be, in effect, a part of the chamber, and the governor valve land 54 vents fluid therefrom to the sump return line 68 if speed N rises above $N_{os}$, or admits pressure fluid from the line 51 if speed N falls below $N_{os}$. In the former case, the bypass valve V2 will open, the engine fuel rate $Q_e$ will decrease, and the engine speed brought back down to $N_{os}$. In the latter case, the valve V2 will tend to close, the flow rate $Q_e$ will tend to increase, and speed will rise to $N_{os}$.

If the malfunction tending to cause overspeed should cure itself, the protective system will revert to a normal status. That is, if speed is being held at $N_{os}$ by the governor G, and the fuel flow rate $Q_e$ for some reason (e.g., the metering valve V1 recloses somewhat from a stuck wide open position), then (i) $\Delta P$ will rise and (ii) speed N will fall. The valve land 40 will rise and the valve land 54 will fall—thereby converting valve V3 back to its neutral position and the valve V4 to its "open down" position. The governor will thus be restored to its normal, inactive condition; the valve V3 will aqain act to maintain $\Delta P$ at the set point; and engine fuel rate will be controlled by the opening of the metering valve V1.

Whenever the governor G is in control and the "constant $\Delta P$" valve V3 has been disabled by the progressive action described above to make the valve land 40 "opened down", fluid is admitted from the pressure source 51, or vented to the sump pressure $P_B$ at conduit 68, to or from the "chamber" by the control action of the governor valve land 54 connecting the conduit 42 either to 51 or 68. Such fluid flow into or out of the chamber C passes through the valve V3 essentially without restriction. Since the valve land 54 will be above or below its neutral position on the port 42a by an amount essentially proportional to the speed error (difference between the set point $N_{os}$ and actual speed), the rate of fluid flow into or out of the "chamber" will be generally proportional to the speed error, and the bypass piston velocity will be proportional to the speed error. This means that the position of the piston 30 will vary as the time integral of the speed error. Such integrating action would ordinarily cause hunting and instability absent any provision for speed droop. To remove that instability, and achieve return of any speed error transient to zero, so that isochronous control of speed can be realized, the integral action described above is modified by the buffer piston 36 with its orifice 56 to provide a temporary, initially high, and gradually diminishing feedback force to the sensing piston 69 on the governor valve rod 60. This has the effect of giving the governor an integral plus proportional gain action, which is more conducive to stability than integral action alone. When a speed error is present, the inflow or outflow of fluid cannot all pass through the orifice 56 without creating a differential pressure drop thereacross. The difference in pressure on the upper and lower sides of the buffer piston makes the latter shift upwardly or downwardly from its centered position and loads the bi-directional spring 55 in tension or compression. The motion of the buffer piston 36 will be proportional to speed error, and will displace a volume of fluid into or out of the cylinder 31 to cause a corresponding motion of the bypass piston 30 since the fluid is essentially incompressible. Thus the contribution to the bypass piston's motion due to displacement of the buffer piston 36 creates the proportional action of the governor, while the bypass piston's motion due to flow through the orifice 56 produces the integral action. The proportional action is temporary because as speed error begins to decrease, the spring 55 pulls or pushes the piston back to its original position where it comes to rest as the speed error reaches zero—flow through the orifice 56, and the pressure drop thereacross, and the displacement of the buffer piston 36 thus gradually returning to zero. So long as any pressure drop exists across that orifice, then a compensating force is exerted on the sensor piston 69 of the governor valve rod. For example, if the actual speed N rises suddenly above the set point $N_{os}$, and fluid is vented at a high flow rate from the chamber C via the valves V3 and V4 and the conduit 68, the buffer piston will begin moving downwardly (compressing the spring 55). The pressure above the orifice 56 will be greater than that below the orifice; these two pressures—applied respectively to the upper and lower surfaces of the piston 69—thus create a net downward force on the rod 60 which aids the spring 61. This makes the speed error appear less than it really is, i.e., it prevents the valve V4 from opening between conduits 42, 68 as much as it otherwise would in the absence of the compensating feedback. Stated another way, the gain factor or transfer function (which makes the velocity of the piston 30 proportional to the speed error) is temporarily reduced that is, it contains a temporary proportionality effect. Therefore, the velocity of the piston 30 is less than it otherwise would be for a given speed error magnitude, due to the presence of the temporary proportionality, so that underspeeding below and hunting about the set point $N_{os}$ is prevented. The compensating force on the piston 69 falls off to zero as speed error approaches zero, however, so that the piston 30 ends up at the new steady state position required to maintain a zero speed error.

The compensation action of the buffer piston 36 is per se old and known in the art, but only in association with governors which act on a series metering valve or the like as a final control element which directly controls engine fuel input rate $Q_e$. It is believed to be new in the art to employ the buffer piston 36 in association with a governor that acts on a bypass valve as the final control element—and thereby to achieve stable, isochronous control without droop and without instability. By such speed control as here described, surges and fluctuation in engine power are avoided when any malfunction, tending to cause overspeeding, arises. The fuel rate $Q_e$ is not severely reduced; engine flame-out is avoided; and the pilot is able to control his aircraft without guessing and correcting for decreases below and fluctuations about the engine power level produced when the speed is maintained at the set point $N_{os}$.

To review the operation of the interconnected pressure drop control means (the valve V3 and its $\Delta P$ sensor 46) and the speed control means (the valve V4 and its speed sensor 58), one may first observe that regardless of the position of the governor valve V4, the bypass valve chamber C is vented by the valve V3 if $\Delta P$ is greater than $\Delta P_d$. On the other hand, if the valve land 40 is below center, and if the speed N is above $N_{os}$, the bypass valve chamber C is vented through the open V3 passage between 38 and 42, and through the open V4 passage between 42 and 68, to the low pressure sump. Thus, it may be said that:

The bypass valve is moved in an opening sense to reduce fuel rate $Q_e$ when $$\Delta P > \Delta P_d \tag{1}$$

or $$\Delta P \leq \Delta P_d \text{ and } N > N_{os}. \tag{2}$$

When the valve V4 is in the illustrated position because N is less than $N_m$, then pressure fluid will be admitted to the bypass valve chamber at a rate determined by the opening of valve V3 below its centered position. Similarly, if valve V3 is substantially below the centered position, pressure fluid will be admitted to the bypass valve chamber C at a rate determined by the V4 opening which connects conduits 51 and 42. Both such cases may be expressed:

The bypass valve is moved in a closing sense to increase engine fuel rate $Q_e$ when $$\Delta P < \Delta P_d \text{ and } N < N_{os}$$

If $\Delta P = \Delta P_d$, and the valve V3 is centered, fluid is, in effect, trapped in the bypass valve chamber C if the valve V4 is open as shown in the drawing. The system is then at steady state with $N \leq N_m$ and $\Delta P$ at the desired set point. If in these circumstances, however, speed N should rise above the value $N_m$ so that the valve land 54 begins to close the port 42a, then the pressure $P1_{fg}$ will begin to fall, and imbalanced leakage from 42 to 38 versus that from 38 to 44 will cause the "chamber" to be vented. This causes the bypass valve V2 to start opening, thereby causing $\Delta P$ to start falling, and thereby forcing the valve rod 41 down to disable the $\Delta P$ control loop. In other words, if the valve V3 is centered and normally in control of the bypass valve V2, the governor valve V4 "takes over"; it removes the ability of the valve V3 to increase $\Delta P$, and it forces $\Delta P$ to fall after the speed rises above $N_m$ and even before it reaches $N_{os}$. This tends to anticipate an overspeed and correct it even before the set point $N_{os}$ is reached; but if and by the time the set point $N_{os}$ is exceeded, the valve land 40 has been lowered sufficiently that the chamber C is vented via 42, 68 when the overspeed set point is exceeded.

The overspeed protection afforded by the present invention is more nearly universal and complete, in safeguarding against all types of failures or malfunctions, compared to overspeed governors or limiters which act on a series metering valve. If the FADEC 24 malfunctions due to an electronic circuit failure, and increases the signal A to a value which opens the valve V1 so as to raise engine speed above the safe overspeed value $N_{os}$, the known and conventional "constant $\Delta P$" apparatus of the prior art would tend to close the bypass valve and therefore aggravate or reinforce the overspeeding. But here, the overspeed governor G anticipates any overspeed by preventing the "constant $\Delta P$" apparatus from closing the bypass valve, and then affirmatively vents the bypass valve chamber if the overspeed set point is exceeded. If the FADEC circuits fail, if the torque motor 25 fails, if, the actuating amplifier 26 fails, if position sensor 27 fails, or if the valve V1 mechanically breaks or sticks in a wide open position—in any of these possibilities, the valve V3 will be prevented from increasing $\Delta P$ when speed rises above some threshold value (here described as $N_m$); and if speed should continue to rise to exceed the overspeed set point, the governor valve V4 will affirmatively open the bypass valve further to hold speed at the $N_{os}$ ceiling. If the $\Delta P$ control valve V3 should stick in a position above neutral, or if the conduit 50 should rupture, or in the case that the conduit 49 becomes blocked, overspeeding will not occur because the valve land 40 will rise above the port 38a and continue to vent the chamber C until the valve V2 is essentially wide open and fuel flow rate $Q_e$ is reduced to a level that overspeeding is impossible even with valve V1 wide open. On the other hand, if the valve V3 should stick in a "down open" position, or if the conduit 49 should rupture, or if the conduit 50 becomes blocked,—the tendency would be for the bypass valve to go to a fully closed position, thereby to increase $Q_e$ and engine speed above a safe level unless the metering valve were closed down to a severe extent. But with the arrangement described, when overspeeding from that source tends to occur (with the valve V3 open down), the governor valve V4 will vent the bypass valve chamber C to restore and hold the speed at the set point $N_{os}$.

The cooperative synergism of (1) the means for maintaining constant $\Delta P$ across the metering valve V1, and (2) the means for governing engine speed at an overspeed set point $N_{os}$ if speed exceeds a given threshold $N_m$—both of which act on the bypass valve V2 as a common final element—is especially advantageous from the standpoint of economy and reliability. The $\Delta P$ control valve V3 is required and utilized in any case so that the primary control system (e.g., the FADEC 24 here shown) can operate such that the engine fuel rate $Q_e$ is known for any given position of the metering valve V1. But with the governor G and its valve V4 coupled through the $\Delta P$ control V3 as here described, overspeeding is prevented when its cause is failure in not only the primary control components or the metering valve V1 but also in the $\Delta P$ control valve.

I claim:

1. In a system for controlling the rate of fuel fed to the burners of a gas turbine engine, the combination comprising
   (a) a positive displacement pump driven by the engine and supplying fuel from a source to a main conduit,
   (b) a main valve disposed between said main conduit and the burners of the engine,
   (c) a variable opening area bypass valve connected between said main conduit and said source to return fuel to the latter,
   (d) hydraulic actuator means responsive to the admission of pressurized fluid, or the venting of fluid, for respectively closing and opening said bypass valve,
   (e) a first valve having a controlled port connected to said hydraulic actuator means (d) to provide a path for the admission of pressure fluid through an input line or the venting of fluid,
   (f) a second valve having a controlled port to supply pressure fluid to or vent fluid from said input line of said first valve,
   (g) means for causing said first valve (i) to connect its controlled port to said input line when the pressure drop $\Delta P$ across said main valve is less than a set point value $\Delta P_d$, and (ii) to connect its controlled port to a low pressure sump when said pressure drop $\Delta P$ is greater than the set point $\Delta P_d$,
   (h) means for causing said second valve (i) to connect its controlled port to a fluid pressure source when the engine speed N is less than a set point value $N_{os}$, and (ii) to connect its controlled port to a low pressure sump when said speed N is greater than the set point $N_{os}$, whereby said bypass valve is moved in an opening sense to decrease fuel flow to the burners for a given position of said main valve when $$\Delta P > \Delta P_d \qquad (1)$$

or $$\Delta P \leq \Delta P_d \text{ and } N > N_{os}, \qquad (2)$$

and said bypass valve is moved in a closing sense to increase fuel flow to the burners for a given position of said main valve when $$\Delta P < \Delta P_d \text{ and } N < N_{os}.$$

2. In a system for controlling the rate of fuel fed to the burners of a gas turbine engine, the combination comprising
   (a) a positive displacement pump driven by the engine and supplying liquid fuel from a source to a main conduit,
   (b) a main valve disposed between said main conduit and the engine inlet,
   (c) a primary control system for variably adjusting said main valve to determine the rate of fuel fed to the engine burners,
   (d) a variable opening area bypass valve connected between said main conduit and said source to return fuel to the latter, said bypass valve having a piston actuator to decrease or increase the effective opening area as fluid is fed into or removed therefrom,
   (e) a $\Delta P$ control valve having an output line connected to said piston actuator, a pressure input line, and a return line leading to a low pressure sump,
   (f) means responsive to the differential pressure $\Delta P$ across said main valve for causing said $\Delta P$ valve (i) to progressively connect said pressure input line to said output line as the differential pressure $\Delta P$ falls below a set point value $\Delta P_d$ and (ii) to progressively connect said return line to said output line as the differential pressure $\Delta P$ rises above said set point value—whereby fluid is respectively fed into or removed from said piston actuator to maintain the differential pressure $\Delta P$ substantially constant as conditions change,
   (g) an overspeed governor including a governor valve having an output line connected to said pressure input line of the $\Delta P$ valve, and first and second supply lines respectively connected to a source of high hydraulic pressure and a low pressure sump,
   (h) said governor including means responsive to the speed of the engine for making said governor valve
      (i) connect said first supply line to said $\Delta P$ control valve pressure input line whenever the engine speed is below a first threshold value $N_m$, but progressively close off the connection as engine speed rises to a set point value $N_{os}$, and
      (ii) progressively connect said second supply line to said $\Delta P$ control valve pressure input line as the engine speed rises above said set point value $N_{os}$, thereby to remove fluid from said piston actuator and open said bypass valve, whereby overspeeding of the engine is prevented by the governor valve overriding the $\Delta P$ control valve to cause progressive opening of the bypass valve as the engine speed rises above the value $N_m$, after which the governor valve modulates the bypass valve position to maintain engine speed at the set point value $N_{os}$.

3. The combination set forth in claim 2 wherein said overspeed governor includes means for making the area of said bypass valve vary as a time integral function of any error between the actual engine speed N and the set point $N_{os}$ when the actual speed N is greater than said threshold value $N_m$ and said differential pressure $\Delta P$ is substantially below its set point value $\Delta P_d$.

4. The combination set forth in claim 3 further characterized by means for making the area of said bypass valve vary also as a temporary proportional function of said error.

5. In a system for controlling the rate of fuel fed to the burners of a gas turbine engine, the combination comprising
   (a) a positive displacement pump driven by the engine and supplying fuel from a source to a main conduit,
   (b) a main valve disposed between said main conduit and the burners of the engine,
   (c) a primary control means normally acting on said main valve to vary the rate of fuel fed therethrough to the engine,
   (d) a variable area bypass valve connected between said main conduit and said source to return fuel to the latter, said bypass valve having an hydraulic actuator associated therewith,
   (e) means coupled to sense the differential pressure drop across said main valve and associated with a $\Delta P$ control valve to (i) connect a hydraulic pressure [$P1_{fg}$] or (ii) a sump return line [$P_B$] to said bypass actuator so as to close or open said bypass valve as the sensed differential pressure $\Delta P$ falls below or rises above a set point $\Delta P_d$,
   (f) an overspeed governor coupled to sense the speed of the engine and having a governor valve associated therewith, said governor valve
      (1) normally coupling a source of pressure [$P1_f$] to said $\Delta P$ valve to create said hydraulic pressure [$P1_{fg}$] when engine speed is at or below a predetermined threshold value $N_m$ which is less than an overspeed set point $N_{os}$,
      (2) progressively closing to attenuate the pressure [$P1_{fg}$] supplied to said $\Delta P$ control valve as the engine speed rises above the threshold value $N_m$ and approaches the set point $N_{os}$, and
      (3) substantially closing off the pressure coupled to said $\Delta P$ control valve but instead coupling the same to a sump return line when engine speed exceeds said overspeed set point $N_{os}$, thereby to shift said bypass valve in an opening direction.

* * * * *